Patented Apr. 25, 1933

1,905,797

UNITED STATES PATENT OFFICE

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT

PROCESS OF TREATING RUBBER AND PRODUCT OBTAINED THEREBY

No Drawing. Original application filed March 2, 1928, Serial No. 258,670. Divided and this application filed March 2, 1928. Serial No. 258,681.

This case is a division of case Serial No. 258,670, filed March 2, 1928.

This invention relates to the treatment of rubber and similar materials and to the products obtained thereby.

An object of the invention is to accelerate the action of the new chemical compounds by the introduction of a base. A further object is to provide a method whereby the basic material may be introduced into rubber.

In the present practice of the use of accelerators, it is generally known that many of the compounds employed are so powerful that they cause a prevulcanization, or burning on the mixing mill. This serious disadvantage is possessed by many of the accelerators which have the property of vulcanizing rubber at ordinary temperatures or at temperatures well below those ordinarily employed in hot vulcanization, for example at 212° or thereabouts. Illustrations of such rapid accelerators are metallic dithiocarbamates, metallic salts of other thioacids, mercapto thiazoles and the like. According to the present invention this serious objection of prevulcanization may be entirely overcome, the rubber compounds may be mixed upon the mill with practically no danger of prevulcanization thereon, without sacrificing the accelerating power which is desired. Certain of the compounds forming the subject matter of the present invention may be mixed with rubber with entire safety on the mixing mills, subject to the conditions hereinafter named, whereas others may be safely mixed, observing certain precautions as to mill temperature, etc.

The invention includes combining rubber and similar vulcanizable materials with a vulcanizing combination, including a vulcanizing agent, a metallic oxide or its equivalent, and a substance containing the radical

and vulcanizing the rubber. The invention also includes the products thus obtained. In

R represents any element, preferably nitrogen, oxygen, carbon, or sulphur; X represents any bivalent element such as sulphur or oxygen, or a trivalent element as in the case of a thiazole; R and X may or may not be parts of a ring. Y is a carbon atom attached at the S of the $$RCS—$$
$$\|$$
$$X$$

radical, and is not doubly bonded to sulphur or oxygen but is a carbon atom of a cyclic or methyl group so substituted that the whole compound which comprises the radical

will react at the thiol sulphur-carbon bond, i. e., at S—Y, with sodium hydroxide in boiling aqueous alcohol at least as rapidly as diphenylmethyl dimethyl dithiocarbamate reacts under the same conditions.

The invention further consists in accelerating the action of the compounds by the addition of basic materials. The invention further consists in introducing basic materials or the compounds herein disclosed by diffusion from rubber or from any surrounding medium.

It will be seen from the list of compounds given below that in the dithiocarbamates R is nitrogen, in the xanthogenates R is oxygen, in the dithiobenzoates R is carbon, and in the mercapto thiazoles R is sulphur; X is sulphur in the dithiocarbamates, xanthogenates, and dithiobenzoates, and is the substituted nitrogen in the mercapto thiazoles. The mercapto thiazoles also afford an example in which the R and X are parts of a ring.

The characteristic groups of these new compounds may be conveniently illustrated as follows:

are among the metallic compounds which may be used.

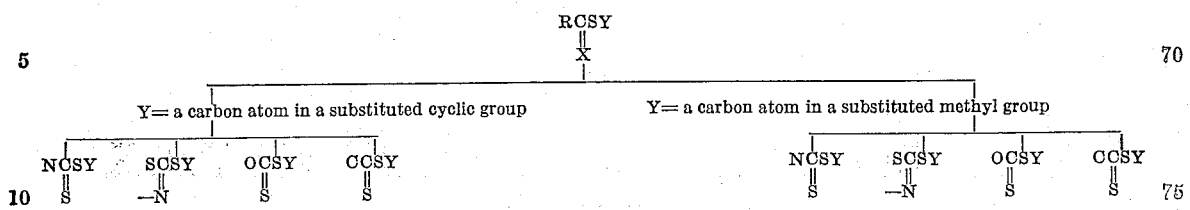

As illustrations of groups comprising Y in which Y is a carbon atom in a substituted cyclic group, the following may be given: 2-4 dinitrophenyl, 2-6 dinitro 4 chlorophenyl, 2-4-6 trinitrophenyl (picryl) etc. As illustrations in which Y is the methyl carbon atom in a substituted methyl group, the following may be given:—diphenyl methyl, triphenyl methyl, phenyl methylene (benzal), trimethyl methyl (tertiary butyl), phenyl chlor methylene, phthalimido methyl, diiodomethyl, allyl, etc.

In the polynitro phenyl substitutions, it will be observed that the three substitutions given above have one nitro group ortho to the 1-position, and at least one of the remaining substituents meta to the aforesaid nitro group. In the dinitro phenyl compounds, the two nitro groups are meta to each other, and one of them is ortho to the 1-position. All of these compounds may be prepared according to the same general procedure, namely, treating a solution of a salt (preferably the sodium salt) of the thiol acid, thiazole, xanthogenate, dithiobenzoate, etc., with a solution of the chloride of the substituted group comprising Y. For example, a solution of sodium dimethyl dithiocarbamate may be treated with a solution of 2-4 dinitro chlor benzol or a benzal chloride.

The whole compound such as 2,4 dinitrophenyl dimethyl dithiocarbamate reacts at least as rapidly with sodium hydroxide in boiling aqueous alcohol as diphenylmethyl dimethyl dithiocarbamate reacts under the same conditions. All the compounds which react with sodium hydroxide at least as rapidly as diphenylmethyl dimethyl dithiocarbamate, accelerate vulcanization, in the presence of a metallic oxide, such as zinc oxide or an equivalent metallic compound.

Zinc oxide is a good illustration of a metallic oxide which may be used. In place of zinc the following elements may be used in combined form preferably somewhat basic and soluble in rubber, mercury preferably in the mercuric state, lead preferably in the plumbous state, cadmium, copper preferably in the cupric state, arsenic preferably in the arsenous state, manganese preferably in the manganous state. Preferably the metallic compound is of such a nature that the metallic element is available during the vulcanization process. Oxides, stearates, carbonates The compounds disclosed herein function well when the cure is carried out according to any of the commercial methods such as in steam, talc, water, etc.

I have observed that the action of the compounds disclosed herein is accelerated by the presence of a small amount of a basic material such as sodium hydroxide, trisodium phosphate, dicyandiamide, piperidine, aniline, dibenzylamine, piperazine hydrate, triethanolamine. The action of the basic substances is particularly marked in the case of the polynitrophenyl compounds such as 2,4 dinitrophenyl dimethyl dithiocarbamate and 2,4 dinitrophenyl benzothiazyl sulphide. The use of the base lowers the temperature at which the accelerator functions or increases its speed of functioning and usually increases the tensile strength at all temperatures of vulcanization by about 10%. For instance a stock made up of 100 parts of pale crepe, 10 parts of zinc oxide, 3 parts of sulphur and .25 part of 2,4 dinitrophenyl dimethyl dithiocarbamate gave in one instance a tensile of 1235 pounds per square inch after 60 minutes at 5 pounds steam pressure and 2980 pounds after 60 minutes at 40 pounds steam pressure. In one instance .07 part of sodium hydroxide was added and the tensile after 60 minutes at 5 pounds steam pressure was 3465 pounds and after 60 minutes at 40 pounds steam pressure the tensile was 3365 pounds. When one part of sodium hydroxide was added to the stock it cured at ordinary temperatures in less than a week and gave a tensile of 4935 pounds after 60 minutes at 5 pounds steam pressure. .15 part of piperidine was added instead of the sodium hydroxide and the stock gave a tensile of 4740 pounds after 60 minutes at 10 pounds steam pressure, 5550 pounds after 60 minutes at 20 pounds steam pressure and 4300 pounds after 60 minutes at 40 pounds steam pressure.

The effect of the base on these dinitrophenyl compounds is much more marked than it is upon other accelerators such as tetramethylthiuram monosulphide, diphenylguanidine, acetaldehyde aniline condensation product or heptaldehyde aniline condensation product.

Since a basic material accelerates the action of the accelerator and lowers the temperature at which it functions, it also increases the speed of burning on the mixing mill. Therefore the greater the amount of base present in the mix, the greater the danger of burning on the mixing mill and rubbers which are basic therefore accelerate the action of these compounds. Burning on the mixing mill is one form of what is herein called premature vulcanization. The latter expression also includes the burning, scorching, or setting up of the stock on mills, calenders, tubing machines, as well as any prevulcanization which may occur or be incipient prior to the actual deliberate vulcanization operation. This is particularly true of the polynitrophenyl compounds.

Instead of adding on the mixing roll the basic materials intended to activate the compounds or accelerate their action, one may permit the basic material to diffuse into the rubber. For instance if the stock given above for vulcanization in the air be vulcanized in air containing ammonia, the vulcanization is greatly accelerated and the surface of the stock is remarkably hard and resistant to marring. The introduction of the basic material may be made on the mill by diffusion from a liquid solution, or gas, or from adjoining rubber stock or from a fabric.

As another example, I make the compounds in the usual manner consisting of 100 parts of pale crepe, 10 parts of zinc oxide, 3 parts of sulphur and 2 parts of 2,4 dinitrophenyl dimethyl dithiocarbamate. This stock in the form of a sheet .060″ thick or in the form of an article may be treated with gaseous ammonia for 16 hours. Thereafter it will vulcanize at 212° F. much more rapidly than a stock not so treated. Instead of gaseous ammonia, I may employ aqueous ammonia, aqueous diethylamine, aqueous aniline or dimethylamine or aniline vapor. It is believed that these basic materials diffuse into the rubber and accelerate the action of the dinitrophenyl dimethyl dithiocarbamate.

Similar results have been obtained with 2,4 dinitrophenyl benzothiazyl sulphide. The action of the bases is most marked with the polynitrophenyl compounds but the bases also function with the other compounds disclosed herein such as triphenylmethyl diethyl dithiocarbamate for instance.

As an example of the introduction by diffusion of the basic material as well as the introduction by diffusion of some of the compounds disclosed herein, the following illustration is given. 100 parts of pale crepe, 10 parts of zinc oxide, 3 parts of sulphur, 1 part of 2,4 dinitrophenyl dimethyl dithiocarbamate and .2 part of monochlor acetic acid are mixed to form one stock which is calendered to a thickness of .010″. Another stock is made up of 100 parts of pale crepe, 10 parts of zinc oxide, 3 parts of sulphur and 4 parts of dibenzylamine. This stock is mixed on the mills in the usual manner and calendered to a thickness of .010″. The two stocks are plied up alternately using 3 plies of each and allowed to stand for 24 hours to permit the diffusion of the dibenzylamine into the dinitrophenyl stock and of the dinitrophenyl dimethyl dithiocarbamate into the dibenzylamine stock. Thereafter the plied up stock is heated at 212° and it is found that vulcanization occurs much more quickly than it does for the individual stocks which have not been plied up. It will be observed that the dibenzylamine acts to neutralize the monochlor acetic acid as well as to activate the dinitrophenyl dimethyl dithiocarbamate.

As pointed out before the presence of the monochlor acetic acid improves the resistance to burning but the procedure may also be carried out without the use of the acid.

Other compounds disclosed herein may be substituted for the compounds given above.

The basic material (ammonia, etc.) may be introduced from the surrounding medium such as air or water to neutralize the acids, and/or to activate the accelerator. For instance if .2 part of acid be added to the stock for air cure given above, and the stock be cured in air containing ammonia gas, the ammonia will not only neutralize the acid but will activate the dinitrophenyl compound. The basic material may be introduced in any desired manner at any time prior to complete vulcanization, i. e., it may be introduced during vulcanization as a gas or vapor, or it may be applied to the stock by painting, dipping, or blending in cement form, etc. before the stock is subjected to vulcanization, or the stock may be vulcanized in a solution or suspension of the basic material.

It is believed that the dinitrophenyl compounds are particularly susceptible to the action of acids and alkalies because the dinitrophenyl compounds of all sorts of acids such as dimethyl dithiocarbamic acid or hydrochloric acid do not hydrolyze readily in acid solution but do hydrolyze in the presence of an alkali or base.

Other compounds which may be employed according to the processes disclosed are:

2,4 dinitrophenyl diethyl dithiocarbamate (M. P. 81° C.)

2,4 dinitrophenyl dinormal propyl dithiocarbamate (M. P. 84° C.)

2,4 dinitrophenyl di-isobutyl dithiocarbamate (M. P. 85° C.)

2,4 dinitrophenyl dinormal butyl dithiocarbamate.

2,4 dinitrophenyl di-iso amyl dithiocarbamate (M. P. 52–54° C.)

2,4 dinitrophenyl dibenzyl dithiocarbamate (M. P. 106° C.)

2,4 dinitrophenyl morpholine dithiocarbamate (M. P. 125–130° C.)

2,4 dinitrophenyl dicyclohexyl dithiocarbamate (M. P. 127° C.)
2,6 dinitro 4 chloro phenyl diethyl dithiocarbamate (M. P. 123° C.)

It will be noted that in these compounds, the nitrogen atom holds at least one aliphatic or alkyl group and is preferably disubstituted. These compounds may also be regarded as thiol esters, the ester group being attached to the thiol sulphur. They are illustrative of compounds containing

where R is nitrogen and X is sulphur.

Further examples include organic derivatives of aryl thiazoles:
2,4 dinitrophenyl benzothiazyl sulphide (M. P. 167° C.)
Picryl benzothiazyl sulphide (M. P. 152° C.)
2,6 dinitro 4 chlorophenyl benzothiazyl sulphide (M. P. 167° C.)
Allyl benzothiazyl sulphide (B. P. 145–148° C.)
Diphenylmethylbenzothiazyl sulphide (M. P. 108° C.)

The last mentioned compounds illustrate compounds in which R and X of the group

are joined, and R=S; X=N. In this instance the general group may be written

where R and X are parts of a ring. They contain the group—

or

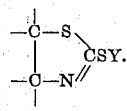

Other derivatives may also be used.
As further illustrations the following may be given:
Phenyl chlor methylene (bis) diethyl dithiocarbamate (M. P. 176–177° C.)
Phenyl methylene bis benzothiazyl sulphide.
Phenyl methylene bis diethyl dithiocarbamate (M. P. 110° C.)
Phenyl methylene bis dimethyl dithiocarbamate (M. P. 180–182° C.)
Other compounds are triphenylmethyl diethyl dithiocarbamate (M. P. 150–155° C.), diphenylmethyl diethyldithiocarbamate (M. P. 85° C.), triphenylmethyl di-isoamyl dithiocarbamate (M. P. 89–90° C.), triphenylmethyl dinormal propyl dithiocarbamate (M. P. 66–67° C.), diphenyl methyl dimethyl dithiocarbamate (M. P. 96.5–97° C.)

Another type is shown in tertiary butyl diethyl dithiocarbamate.

Still further groups are illustrated by allyl diethyl dithiocarbamate (B. P. 110–111° C.), phthalimido methyldiethyl dithiocarbamate (M. P. 122° C.), di-iodo methyl dimethyl dithiocarbamate (M. P. 76° C.), and trimethyl methyl diethyl dithiocarbamate respectively.

Triphenylmethyl ethyl xanthogenates and 2,6 dinitro 4 chlorophenyl dithiobenzoate also accelerate vulcanization and constitute examples of xanthogenates, (R=O, X=S), and dithiobenzoates (R=C, X=S).

All of the above compounds are new chemicals, not recorded in the literature. The preparation of these materials forms the subject matter of separate applications.

All of the above mentioned compounds are accelerators of vulcanization. Some of them give high tensile strength and other valuable physical properties such as improved resistance to abrasion, ageing, and other properties. The claims are therefore to be broadly interpreted as including such treatment of rubber in any form (solid, solution, dispersion) for these purposes, as well as for vulcanization, in which latter instance, it is understood that a vulcanizing agent and a metallic oxide or its equivalent will be added to the rubber, and an antioxidant or other material improving the physical properties of the rubber may be present, if desired. It is of course understood that not all of these compounds are of equal accelerating strength, pound for pound, under identical vulcanizing conditions. These accelerators may be used in conjunction with any of the known antioxidants and other materials introduced into rubber to improve ageing and other physical properties.

Diphenyl methyl dimethyl dithiocarbamate, diphenyl methyl diethyl dithiocarbamate, diphenyl methyl benzothiazyl sulphide, allyl diethyl dithiocarbamate, allyl benzothiazyl sulphide accelerate, but the degree of acceleration is very small, and at present is regarded as of no commercial importance. Phthalimido methyl diethyl dithiocarbamate accelerates vulcanization somewhat more than the diphenyl methyl compounds, and it hydrolyzes somewhat more rapidly than diphenyl methyl dimethyl dithiocarbamate. Methyl dimethyl dithiocarbamate and ethyl benzothiazyl sulphide are examples of compounds which do not hydrolyze as rapidly as diphenyl methyl dimethyl dithiocarbamate in the herein described test, and the pure compounds did not accelerate vulcanization under the conditions given above as examples.

The accelerating compounds in general may be used in amounts varying between $\frac{1}{10}$ and 2 parts on 100 parts of rubber, depending of course on the type of stock, etc.

It is believed that, in general, as the molecular weight of the groups attached to the nitrogen is increased the higher is the vulcanizing temperature, when equi-molecular amounts of accelerator are considered, and the more resistant are the compounds to pre-vulcanization on the mixing mills, and the better is their action with litharge in the absence or presence of zinc oxide.

The rate of reaction of the compound with sodium hydroxide in boiling aqueous alcohol may be determined as follows:

.00125 moles of the compound is weighed into a 50 cc. Erlenmeyer; 25 cc. 95% alcohol and .00125 moles sodium hydroxide in the form of an approximately normal solution are added and the solution brought to the boiling point as quickly as possible and kept there for exactly 30 minutes. The solution is then cooled quickly and titrated with approximately $$\frac{N}{10}$$

acid, using phenolphthalein as the indicator. Carbon dioxide-free water should be used throughout. A blank should be run in order to check up on the amount of acid necessary to neutralize the sodium hydroxide when no compound is used. The decrease in hydroxyl ion content during the boiling is taken as a measure of the extent of the reaction with sodium hydroxide.

The above procedure constitutes a method whereby the relative rate of hydrolysis of any given compound of the types disclosed may be compared with that of diphenyl-methyl dimethyl dithiocarbamate which in turn may be prepared in accordance with the general procedure indicated herein, that is, reacting together sodium dimethyl dithiocarbamate and diphenyl chloro methane.

Having thus described my invention what I claim and desire to protect by Letters Patent is:

1. A method of treating rubber which comprises adding to rubber a vulcanizing combination including a compound containing the group $$\overset{\text{RCSY,}}{\underset{X}{\|}}$$

in which R represents either N, O, or C or further represents S when X is N; X represents O or S, or further represents N when R is S; and Y represents a carbon atom in a substituted cyclic group, or in a substituted methyl group that does not contain O or S doubly bonded to Y, which compound hydrolyzes in aqueous alcohol in the presence of sodium hydroxide, at least as rapidly as diphenyl methyl dimethyl dithiocarbamate under the same conditions, and carrying out the vulcanization of the rubber in the presence of a basic material introduced thereinto.

2. A method of treating rubber which comprises adding to rubber a vulcanizing combination including a compound containing the group $$\overset{\text{RCSY,}}{\underset{X}{\|}}$$

in which R represents either N, O, or C or further represents S when X is N; X represents O or S, or further represents N when R is S; and Y represents a carbon atom in a substituted cyclic group, or in a substituted methyl group that does not contain O or S doubly bonded to Y, which compound hydrolyzes in aqueous alcohol in the presence of sodium hydroxide, at least as rapidly as diphenyl methyl dimethyl dithiocarbamate under the same conditions, and further introducing a basic material into the rubber stock prior to complete vulcanization.

3. A method of treating rubber which comprises adding to rubber a vulcanizing combination including a compound containing the group $$\overset{\text{RCSY.}}{\underset{X}{\|}}$$

in which R is N; X is S; and Y represents a carbon atom in a substituted cyclic group, or in a substituted methyl group that does not contain O or S doubly bonded to Y, which compound hydrolyzes in aqueous alcohol in the presence of sodium hydroxide, at least as rapidly as diphenyl methyl dimethyl dithiocarbamate under the same conditions, and carrying out the vulcanization of the rubber in the presence of a basic material introduced thereinto.

4. A method of treating rubber which comprises adding to rubber a vulcanizing combination including a compound containing the group $$\overset{\text{RCSY,}}{\underset{X}{\|}}$$

in which R is N; X is S; and Y represents a carbon atom in a substituted cyclic group, or in a substituted methyl group that does not contain O or S doubly bonded to Y, which compound hydrolyzes in aqueous alcohol in the presence of sodium hydroxide, at least as rapidly as diphenyl methyl dimethyl dithiocarbamate under the same conditions, and further introducing a basic material into the rubber stock prior to complete vulcanization.

5. A method of treating rubber which comprises adding to rubber a vulcanizing combination including a compound containing the group $$\overset{\text{RCSY,}}{\underset{X}{\|}}$$

in which R represents either N, O, or C or further represents S when X is N; X represents O or S, or further represents N when R is S; and Y represents a carbon atom in a substituted aryl group, or in a substituted methyl group that does not contain O or S doubly bonded to Y, which compound hydrolyzes in aqueous alcohol in the presence of sodium hydroxide, at least as rapidly as diphenyl methyl dimethyl dithiocarbamate under the same conditions, and carrying out the vulcanization of the rubber in the presence of a basic material introduced thereinto.

6. A method of treating rubber which comprises adding to rubber a vulcanizing combination including a compound containing the group

in which R represents either N, O, or C, or further represents S when X is N; X represents O or S, or further represents N when R is S; and Y represents a carbon atom in a substituted phenyl group, or in a substituted methyl group that does not contain O or S doubly bonded to Y, which compound hydrolyzes in aqueous alcohol in the presence of sodium hydroxide, at least as rapidly as diphenyl methyl dimethyl dithiocarbamate under the same conditions, and carrying out the vulcanization of the rubber in the presence of a basic material introduced thereinto.

7. A method of treating rubber which comprises adding to rubber a vulcanizing combination including a compound containing the group

in which R represents either N, O, or C or further represents S when X is N; X represents O or S, or further represents N when R is S; and Y represents a carbon atom in a poly nitrophenyl group, or in a substituted methyl group that does not contain O or S doubly bonded to Y, which compound hydrolyzes in aqueous alcohol in the presence of sodium hydroxide, at least as rapidly as diphenyl methyl dimethyl dithiocarbamate under the same conditions, and carrying out the vulcanization of the rubber in the presence of a basic material introduced thereinto.

8. A method of treating rubber which comprises adding to rubber a vulcanizing combination including a compound containing the group

in which R is N; X is S; and Y represents a carbon atom in a poly nitrophenyl group, or in a substituted methyl group that does not contain O or S doubly bonded to Y, which compound hydrolyzes in aqueous alcohol in the presence of sodium hydroxide, at least as rapidly as diphenyl methyl dimethyl dithiocarbamate under the same conditions, and carrying out the vulcanization of the rubber in the presence of a basic material introduced thereinto.

9. A method of treating rubber which comprises adding to rubber a vulcanizing combination including a compound containing the group

in which R represents either N, O, or C or further represents S when X is N; X represents O or S, or further represents N when R is S; and Y represents a carbon atom in a substituted cyclic group, or in a substituted methyl group that does not contain O or S doubly bonded to Y, which compound hydrolyzes in aqueous alcohol in the presence of sodium hydroxide, at least as rapidly as diphenyl methyl dimethyl dithiocarbamate under the same conditions, and vulcanizing in the presence of ammonia.

10. A method of treating rubber which comprises adding to rubber a vulcanizing combination including a compound containing the group

in which R is N; X is S; and Y represents a carbon atom in a substituted cyclic group, or in a substituted methyl group that does not contain O or S doubly bonded to Y, which compound hydrolyzes in aqueous alcohol in the presence of sodium hydroxide, at least as rapidly as diphenyl methyl dimethyl dithiocarbamate under the same conditions, and vulcanizing in the presence of ammonia.

11. A method of treating rubber which comprises adding to rubber a vulcanizing combination including a compound containing the group

in which R represents either N, O, or C or further represents S when X is N; X represents O or S, or further represents N when R is S; and Y represents a carbon atom in a substituted aryl group, or in a substituted methyl group that does not contain O or S doubly bonded to Y, which compound hydrolyzes in aqueous alcohol in the presence of sodium hydroxide, at least as rapidly as diphenyl methyl dimethyl dithiocarbamate under the same conditions, and vulcanizing in the presence of ammonia.

12. A method of treating rubber which comprises adding to rubber a vulcanizing combination including a compound containing the group

in which R represents either N, O or C or further represents S when X is N; X represents O or S, or further represents N when R is S; and Y represents a carbon atom in a substituted phenyl group, or in a substituted methyl group that does not contain O or S doubly bonded to Y, which compound hydrolyzes in aqueous alcohol in the presence of sodium hydroxide, at least as rapidly as diphenyl methyl dimethyl dithiocarbamate under the same conditions, and vulcanizing in the presence of ammonia.

13. A method of treating rubber which comprises adding to rubber a vulcanizing combination including a compound containing the group

in which R represents either N, O or C or further represents S when X is N; X represents O or S, or further represents N when R is S; and Y represents a carbon atom in a poly nitro phenyl group, or in a substituted methyl group that does not contain O or S doubly bonded to Y, which compound hydrolyzes in aqueous alcohol in the presence of sodium hydroxide, at least as rapidly as diphenyl methyl dimethyl dithiocarbamate under the same conditions, and vulcanizing in the presence of ammonia.

14. A method of treating rubber which comprises adding to rubber a vulcanizing combination including a compound containing the group

RCSY,
||
X in which R is N; X is S; and Y represents a carbon atom in a poly nitro phenyl group, or in a substituted methyl group that does not contain O or S doubly bonded to Y, which compound hydrolyzes in aqueous alcohol in the presence of sodium hydroxide, at least as rapidly as diphenyl methyl dimethyl dithiocarbamate under the same conditions, and vulcanizing in the presence of ammonia.

15. The process of producing vulcanized rubber which comprises heating rubber, a metallic oxide, and a vulcanizing agent in the presence of a mixture comprising a basic material and a compound containing the group

where R is sulphur, X is nitrogen, and Y is a carbon atom in a substituted cyclic group, or in a substituted methyl group that does not contain O or S doubly bonded to Y, which compound hydrolyzes in aqueous alcohol in the presence of sodium hydroxide, at least as rapidly as diphenyl-methyl dimethyl dithiocarbamate under the same conditions.

16. The process of producing vulcanized rubber which comprises heating rubber, a metallic oxide, and a vulcanizing agent in the presence of a mixture comprising an organic amine and a compound containing the group

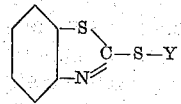

where Y is a carbon atom in a substituted cyclic group, or in a substituted methyl group that does not contain O or S doubly bonded to Y, which compound hydrolyzes in aqueous alcohol in the presence of sodium hydroxide, at least as rapidly as diphenylmethyl dimethyl dithiocarbamate under the same conditions.

17. The process of producing vulcanized rubber which comprises heating rubber, a metallic oxide, and a vulcanizing agent in the presence of a mixture comprising an organic amine and a compound containing the group

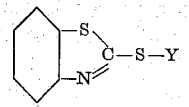

where Y is the methyl carbon atom of a substituted methyl group that does not contain O or S doubly bonded to Y, which compound hydrolyzes in aqueous alcohol in the presence of sodium hydroxide, at least as rapidly as diphenyl-methyl dimethyl dithiocarbamate under the same conditions.

18. The process of producing vulcanized rubber which comprises heating rubber, a metallic oxide, and a vulcanizing agent in the presence of a mixture comprising a secondary amine accelerating compound and a compound containing the group

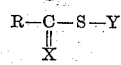

where R is sulphur, X is nitrogen, and Y is a carbon atom in a substituted cyclic group, or in a substituted methyl group that does not contain O or S doubly bonded to Y, which compound hydrolyzes in aqueous alcohol in the presence of sodium hydroxide, at least as rapidly as diphenyl-methyl dimethyl dithiocarbamate under the same conditions.

19. The process of producing vulcanized rubber which comprises heating rubber, a metallic oxide, and a vulcanizing agent in the presence of a mixture comprising a secondary amine accelerating compound and a compound containing the group

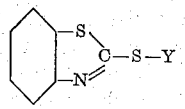

where Y is the methyl carbon atom of a substituted methyl group that does not contain O or S doubly bonded to Y, which compound hydrolyzes in aqueous alcohol in the presence of sodium hydroxide, at least as rapidly as diphenyl-methyl dimethyl dithiocarbamate under the same conditions.

20. The process of producing vulcanized rubber which comprises heating rubber, a metallic oxide, and a vulcanizing agent in the presence of a mixture comprising an aryl substituted secondary amine accelerating compound and a compound containing the group

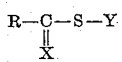

where R is sulphur, X is nitrogen, and Y is a carbon atom in a substituted cyclic group, or in a substituted methyl group that does not contain O or S doubly bonded to Y, which compound hydrolyzes in aqueous alcohol in the presence of sodium hydroxide, at least as rapidly as diphenyl-methyl dimethyl dithiocarbamate under the same conditions.

21. The process of producing vulcanized rubber which comprises heating rubber, a metallic oxide, and a vulcanizing agent in the presence of a mixture comprising an aryl substituted secondary amine accelerating compound and a compound containing the group

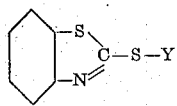

where Y is the methyl carbon atom of a substituted methyl group that does not contain O or S doubly bonded to Y, which compound hydrolyzes in aqueous alcohol in the presence of sodium hydroxide, at least as rapidly as diphenyl-methyl dimethyl dithiocarbamate under the same conditions.

22. The process of producing vulcanized rubber which comprises heating rubber, a metallic oxide, and a vulcanizing agent in the presence of a mixture comprising an aryl substituted secondary amine accelerating compound and phenyl methylene bis benzothiazyl sulphide.

23. A vulcanization accelerator mixture comprising a secondary amine accelerating compound and a compound containing the group

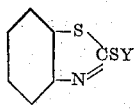

where Y is a carbon atom in a substituted cyclic group, or in a substituted methyl group that does not contain O or S doubly bonded to Y, which compound hydrolyzes in aqueous alcohol in the presence of sodium hydroxide, at least as rapidly as diphenyl-methyl dimethyl dithiocarbamate under the same conditions.

24. A vulcanization accelerator mixture comprising an aryl substituted secondary amine accelerating compound and a compound containing the group

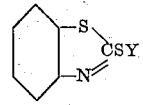

where Y is the methyl carbon atom of a substituted methyl group that does not contain O or S doubly bonded to Y, which compound hydrolyzes in aqueous alcohol in the presence of sodium hydroxide, at least as rapidly as diphenyl-methyl dimethyl dithiocarbamate under the same conditions.

25. A method of treating rubber which comprises adding to rubber a vulcanizing combination including a polynitrophenyl compound of a disubstituted dithiocarbamate, which compound hydrolyzes in aqueous alcohol in the presence of sodium hydroxide at least as rapidly as diphenyl methyl dimethyl dithiocarbamate under the same conditions, and carrying out vulcanization of the rubber in the presence of a basic material introduced thereinto.

26. A vulcanization accelerator mixture comprising an organic amine and phenyl methylene bis benzothiazyl sulphide.

27. A method of treating rubber which comprises adding to rubber a vulcanizing combination including a polynitrophenyl compound of a dialkyl dithiocarbamate, which compound hydrolyzes in aqueous alcohol in the presence of sodium hydroxide at least as rapidly as diphenyl methyl dimethyl dithiocarbamate under the same conditions, and carrying out vulcanization of the rubber in the presence of a basic material introduced thereinto.

28. A method of treating rubber which comprises adding to rubber a vulcanizing combination including a polynitrophenyl compound of a dialkyl dithiocarbamate, which compound hydrolyzes in aqueous alcohol in the presence of sodium hydroxide at least as rapidly as diphenyl methyl dimethyl dithiocarbamate under the same conditions, and carrying out vulcanization of the rubber in the presence of a basic material diffused thereinto.

29. A method of treating rubber which comprises adding to rubber a vulcanizing combination including a dinitrophenyl compound of a disubstituted dithiocarbamate, which compound hydrolyzes in aqueous alcohol in the presence of sodium hydroxide at least as rapidly as diphenyl methyl dimethyl dithiocarbamate under the same conditions, and carrying out vulcanization of the rubber in the presence of a basic material introduced thereinto.

30. A method of treating rubber which comprises adding to rubber a vulcanizing combination including a dinitrophenyl dialkyl dithiocarbamate, which compound hydrolyzes in aqueous alcohol in the presence of sodium hydroxide at least as rapidly as diphenyl methyl dimethyl dithiocarbamate under the same conditions, and carrying out vulcanization of the rubber in the presence of a basic material introduced thereinto.

31. A method of treating rubber which comprises adding to rubber a vulcanizing agent, a metallic oxide, and a dinitro phenyl compound of a disubstituted dithiocarbamate in which the nitro groups are meta to each other and one of them is ortho to the CS bond, which compound hydrolyzes in aqueous alcohol in the presence of sodium hydroxide at least as rapidly as diphenyl methyl dimethyl dithiocarbamate under the same conditions, and vulcanizing the rubber in the presence of a base introduced into the rubber prior to complete vulcanization.

32. A method of treating rubber which comprises adding to rubber a vulcanizing agent, a metallic oxide, and a dinitro phenyl dialkyl dithiocarbamate in which the nitro groups are meta to each other and one of them is ortho to the CS bond, which compound hydrolyzes in aqueous alcohol in the presence of sodium hydroxide at least as rapidly as diphenyl methyl dimethyl dithiocarbamate under the same conditions, and vulcanizing the rubber in the presence of a base introduced into the rubber prior to complete vulcanization.

33. A method of treating rubber which comprises adding to rubber a vulcanizing agent, a metallic oxide, and a 2-4 dinitro phenyl composed of a disubstituted dithiocarbamate, which compound hydrolyzes in aqueous alcohol in the presence of sodium hydroxide at least as rapidly as diphenyl methyl dimethyl dithiocarbamate under the same conditions, and further introducing a basic material into the rubber during the vulcanization of said rubber.

34. A method of treating rubber which comprises adding to rubber a vulcanizing agent, a metallic oxide, and a 2-4 dinitro phenyl compound of a dialkyl dithiocarbamate, and further introducing a basic material into the rubber during the vulcanization of said ruber.

35. A method of treating rubber which comprises adding to rubber a vulcanizing agent, a metallic oxide, and a 2-4 dinitro phenyl compound of a dialkyl dithiocarbamate, and vulcanizing in the presence of ammonia.

36. A method of treating rubber which comprises adding to rubber a vulcanizing agent, a metallic oxide, and 2-4 dinitrophenyl dimethyl dithiocarbamate, and further introducing a basic material into the rubber during the vulcanization of said rubber.

37. A method of treating rubber which comprises adding to rubber, sulphur, zinc oxide, and 2-4 dinitrophenyl dimethyl dithiocarbamate, and vulcanizing the mixture in the presence of ammonia.

38. The process of producing vulcanized rubber which comprises heating rubber and sulfur in the presence of a mixture of accelerators, said accelerators comprising the reaction product of dinitrochlorbenzene and an alkaline salt of mercapto-benzo-thiazole, and a basic organic nitrogen-containing vulcanization accelerator.

39. The process of producing vulcanized rubber which comprises heating rubber and sulfur in the presence of a mixture of accelerators, said accelerators comprising the reaction product of dinitrochlorbenzene and the potassium salt of mercapto-benzo-thiazole, and a basic organic nitrogen-containing vulcanization accelerator.

40. The process of producing vulcanized rubber which comprises heating rubber and sulfur in the presence of a mixture of accelerators, said accelerators comprising the reaction product of dinitrochlorbenzene and the potassium salt of mercapto-benzo-thiazole, and a secondary amine accelerating compound.

41. The process of producing vulcanized rubber which comprises heating rubber and sulfur in the presence of a mixture of accelerators, said accelerators comprising the reaction product of dinitrochlorbenzene and the potassium salt of mercapto-benzo-thiazole, and an aryl substituted secondary amine accelerating compound.

42. The process of producing vulcanized rubber which comprises heating rubber and sulfur in the presence of a vulcanization accelerating product containing the reaction product of dinitrochlorbenzene and an alkaline salt of mercapto-benzo-thiazole as a constituent thereof.

43. The process of producing vulcanized rubber which comprises heating rubber and sulfur in the presence of a vulcanization accelerating product containing the reaction product of dinitrochlorbenzene and the potassium salt of mercapto-benzo-thiazole as a constituent thereof.

44. The vulcanized rubber product prepared by heating rubber and sulfur in the presence of a mixture of accelerators, said accelerators comprising a reaction product of dinitrochlorbenzene and an alkaline salt of mercapto-benzo-thiazole, and a basic organic nitrogen-containing vulcanization accelerator.

45. The vulcanized rubber product prepared by heating rubber and sulfur in the presence of a mixture of accelerators, said accelerators comprising the reaction product of dinitrochlorbenzene and the potassium salt of mercapto-benzo-thiazole, and a basic organic nitrogen-containing vulcanization accelerator.

46. The vulcanized rubber product prepared by heating rubber and sulfur in the presence of a mixture of accelerators, said accelerators comprising the reaction product of dinitrochlorbenzene and the potassium salt of mercapto-benzo-thiazole and a secondary amine accelerating compound.

47. The vulcanized rubber product prepared by heating rubber and sulfur in the presence of a mixture of accelerators, said accelerators comprising the reaction product of dinitrochlorbenzene and the potassium salt of mercapto-benzo-thiazole, and an aryl substituted secondary amine accelerating compound.

48. A vulcanization accelerator mixture comprising an aryl substituted secondary amine accelerating compound and 2.4-dinitrophenyl benzothiazyl sulphide.

49. The vulcanized rubber product prepared by heating rubber and sulfur in the presence of a vulcanization accelerating product containing the reaction product of dinitrochlorbenzene and an alkaline salt of mercapto-benzo-thiazole as a constituent thereof.

50. The vulcanized rubber product prepared by heating rubber and sulfur in the presence of a vulcanization accelerating product containing the reaction product of dinitrochlorbenzene and the potassium salt of mercapto-benzo-thiazole as a constituent thereof.

51. A vulcanization accelerator mixture comprising an organic amine and a compound containing the group

where R is sulphur, X is nitrogen, and Y is a carbon atom in a substituted cyclic group. or in a substituted methyl group that does not contain O or S doubly bonded to Y, which compound hydrolyzes in aqueous alcohol in the presence of sodium hydroxide, at least as rapidly as diphenyl-methyl dimethyl dithiocarbamate under the same conditions.

52. A vulcanization accelerator mixture comprising a secondary amine accelerating compound and a compound containing the group

where Y is the methyl carbon atom of a substituted methyl group that does not contain O or S doubly bonded to Y, which compound hydrolyzes in aqueous alcohol in the presence of sodium hydroxide, at least as rapidly as diphenyl-methyl dimethyl dithiocarbamate under the same conditions.

53. A vulcanization accelerator mixture comprising an organic amine and the reaction product of dinitrochlorbenzene and the potassium salt of mercapto-benzo-thiazole.

Signed at New York, county and State of New York, this 23rd day of February, 1928.

SIDNEY M. CADWELL.